(12) United States Patent
Pigg

(10) Patent No.: US 6,733,175 B1
(45) Date of Patent: May 11, 2004

(54) CHILD POSITIONER FOR X-RAY PHOTOGRAPHY

(76) Inventor: Jeffrey Pigg, 1242 Savannah Hwy., Waynesboro, TN (US) 38485

( * ) Notice: Subject to any disclaimer, the term of this patent is extended or adjusted under 35 U.S.C. 154(b) by 0 days.

(21) Appl. No.: 10/038,025

(22) Filed: Jan. 2, 2002

(51) Int. Cl.$^7$ .............................................. G03B 42/02
(52) U.S. Cl. ...................... 378/167; 378/177; 378/180; 378/208
(58) Field of Search ................ 378/167, 177, 378/178, 179, 180, 208

(56) References Cited

U.S. PATENT DOCUMENTS 3,051,832 A   8/1962  Pigg
5,600,702 A   2/1997  Pigg

Primary Examiner—David V. Bruce
Assistant Examiner—Courtney Thomas
(74) Attorney, Agent, or Firm—Miller & Martin LLP

(57) ABSTRACT

A child positioning apparatus for X-ray photography having improved adjustment mechanisms. In particular the positioning of the X-ray film cassette has been improved by using a friction fastner. The friction fastner passes through a groove in the vertical portion of a L-bracket and attaches to a tray for holding the X-ray film. The position of the tray is adjusted by loosening the friction fastener, positioning the tray and then re-tightening to fix the X-ray film cassette into place.

21 Claims, 9 Drawing Sheets

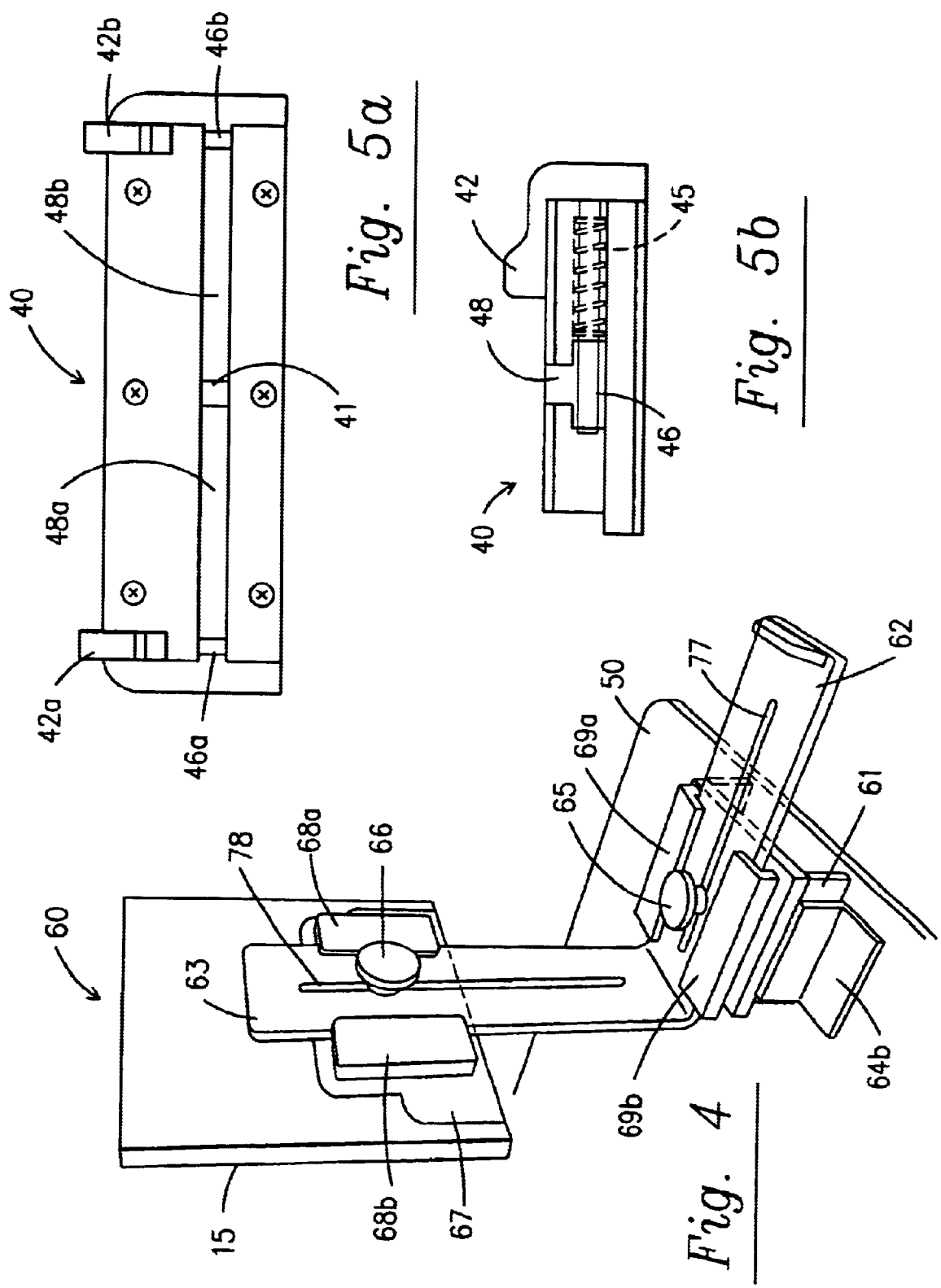

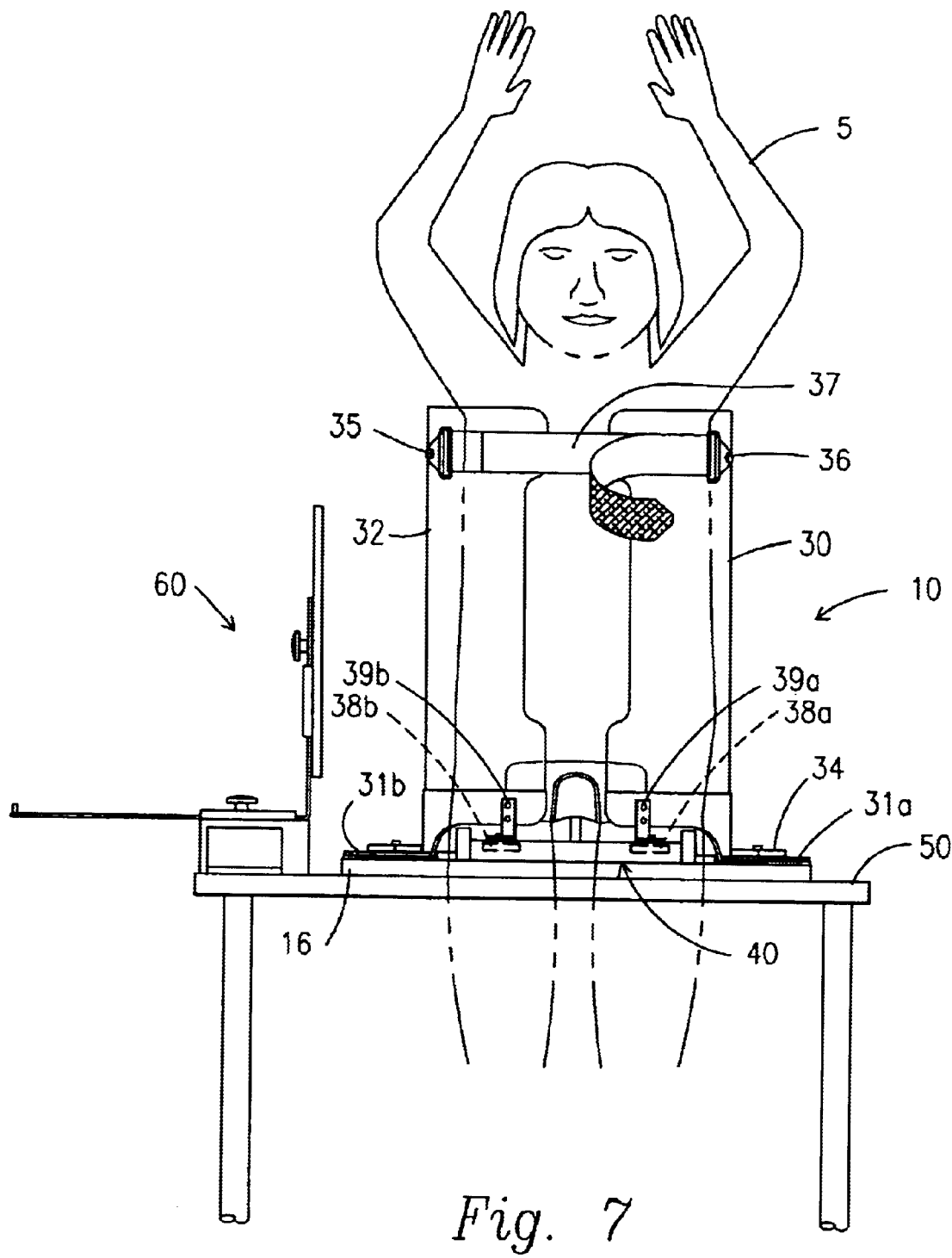

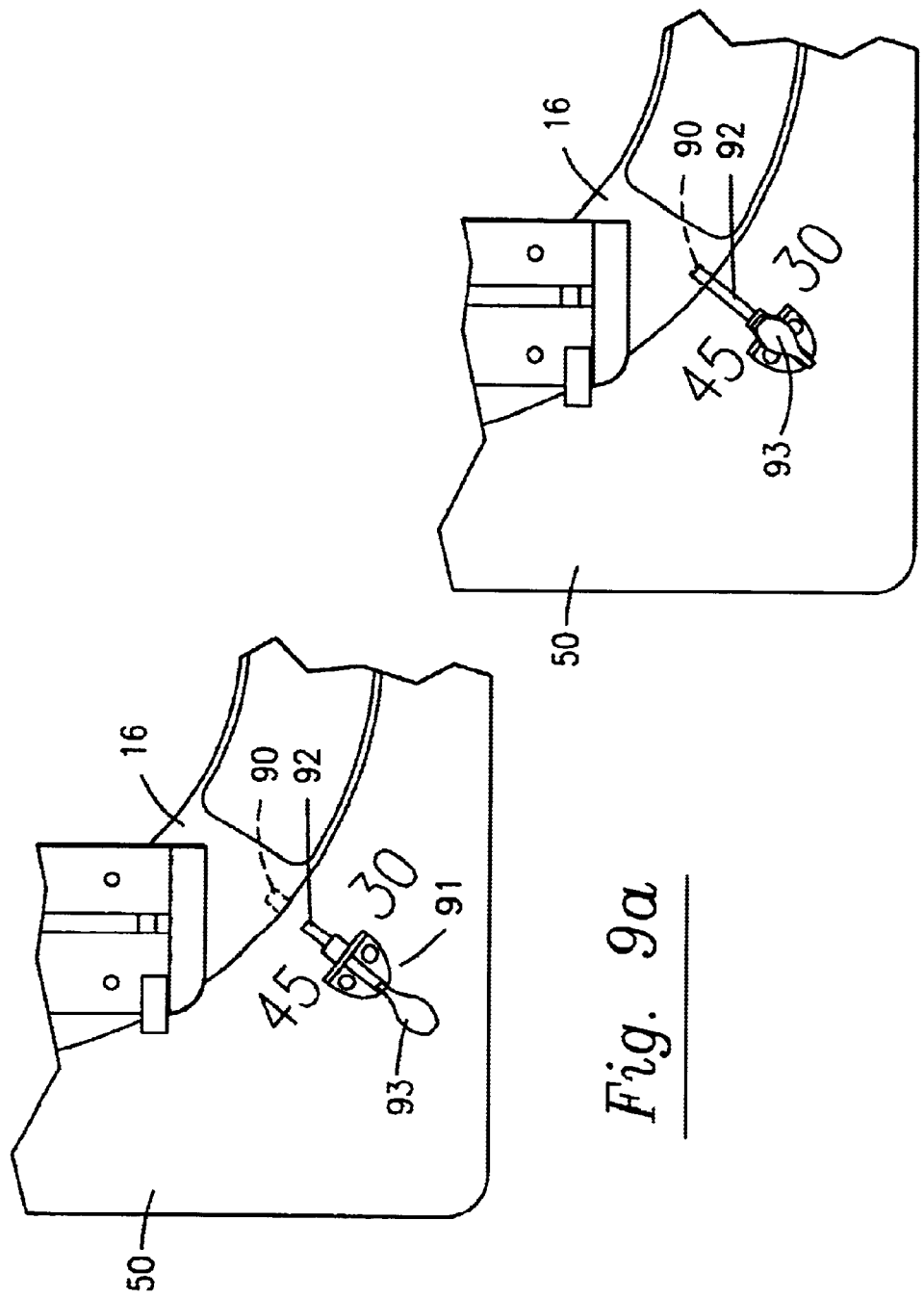

CHILD POSITIONER FOR X-RAY PHOTOGRAPHY

FIELD OF THE INVENTION

The present invention relates to a child positioning apparatus for X-ray photography or imaging and more particularly to a child positioning apparatus for X-ray photography with adjustable dial lock features an improved upright latch and adjustment.

BACKGROUND OF THE INVENTION

An X-ray positioner for an upright child is first described in U.S. Pat. No. 3,051,832 ('832) issued to Jalmer Pigg, Sr. on Aug. 28, 1962, the contents of which are incorporated herein by reference. While the device described in the '832 patent was effective in the upright positioning of a child being X-rayed, there were several shortcomings in its operation.

A significant problem with the '832 invention was the complex method used to adjust the position of the X-ray film cassette relevant to the position of the patient. As best seen in FIG. 1, the '832 film positioner 100 principally comprised film carriage 104 which included hooks 101 with the X-ray cassette 103 resting on the hooks 101. Film positioner 100 had rear side tracks (not shown) which extended to the rear of the L-angle 108. Latch 105 in the '832 patent was employed to secure carriage 104 in position after having been adjusted upward or downward by an X-ray technician. In tightening the latch 105, the hard surface of the latch 105 was tightened against the hard surface of the rear tracks 106 of the carriage 104. To create adequate friction between the two hard surfaces the latch 105 was often over-tightened, placing great stress on mounting pin 109 and resulting in frequent breakage. A similar mechanism was used on the shield and indicia device located on the front of the child positioner, also shown in FIG. 1 as 110.

A subsequent patent, U.S. Pat. No. 5,600,702 ('702) attempted to resolve these latching issues by adding pads at the end of the latch to increase friction between the latch and the film holder. As best seen in FIG. 2, friction pads 107 were added to the end of the latch against the sidetracks of the carriage 104 to attempt to obviate the necessity of over-tightening the latch. Similarly, friction pads 107 were added to latch 111 that secures indicia plate 112 into position. While the problem of ineffective latching is mitigated by this improvement, the process remains unwieldy and generally requires the use of two hands to adjust the position of the X-ray film cassette. One hand is used to hold the cassette carriage while another hand operates the latching mechanism.

A second problem not addressed by either U.S. Pat. No. 3,051,832 or U.S. Pat. No. 5,600,702 is the difficulty associated with placing the child in the positioner while adjusting the left and right upright restraints in place around the child. Formerly, the uprights were secured to the carousel by sliding a wedge attached to the upright by an L-bracket, into a slide block by passing the wedge over a pop-up button. The upright would then be held in place as the pop-up button released, blocking passage of the wedge out of the slide block. Over time, these pop-up buttons have tended to become increasingly less responsive, permitting the wedges to slide out of the slide blocks at inopportune times. The pop-up button fastener is particularly problematic when, over time, the pop-up button wears a groove on the bottom of the slide block. In this instance the pop-up button begins to rest at the bottom of the wear-groove and the wedge is able to slide out of the channel unimpeded.

SUMMARY OF THE INVENTION

It is therefore an object of the invention to provide an upright child positioning apparatus for X-ray photography with improved adjustment mechanisms.

It is a further object of the invention to provide a child positioning apparatus with improved placement and locking of the left and right upright restraint members.

The present invention provides for these and other objectives with at least three material advantages over the prior art. First, the invention uses an X-ray film cassette positioning system that can be operated by using a single hand. The film cassette is restrained in position by two friction fasteners such as dial knobs. One dial knob restrains the film cassette vertically and a second dial knob restrains the cassette horizontally. Second, a similar positioning system is used to hold the position of the shield and indicia plate. A single dial knob maybe used to hold the position of the shield on which the various indicia markers are placed. Third, the upright restraints are more securely held in place with improved fasteners at the ends of the channels of the slide block and an improved strap assembly. In addition, a new turntable locking mechanism has been devised.

BRIEF DESCRIPTION OF THE DRAWINGS

FIG. 4 is a perspective view of the film cassette positoner of the present invention.

FIG. 5a is a top plan view of the slide block of the present invention.

FIG. 5b is a cut-away view of the slide block showing the spring mechanism.

FIG. 7 is a side plan view of the upright restraints of this invention with strap portions engaged.

FIG. 9a is a top view of the lock disengaged from the carousel.

FIG. 9b is a top view of the lock engaging the carousel.

DETAILED DESCRIPTION OF THE INVENTION

Figure 1:
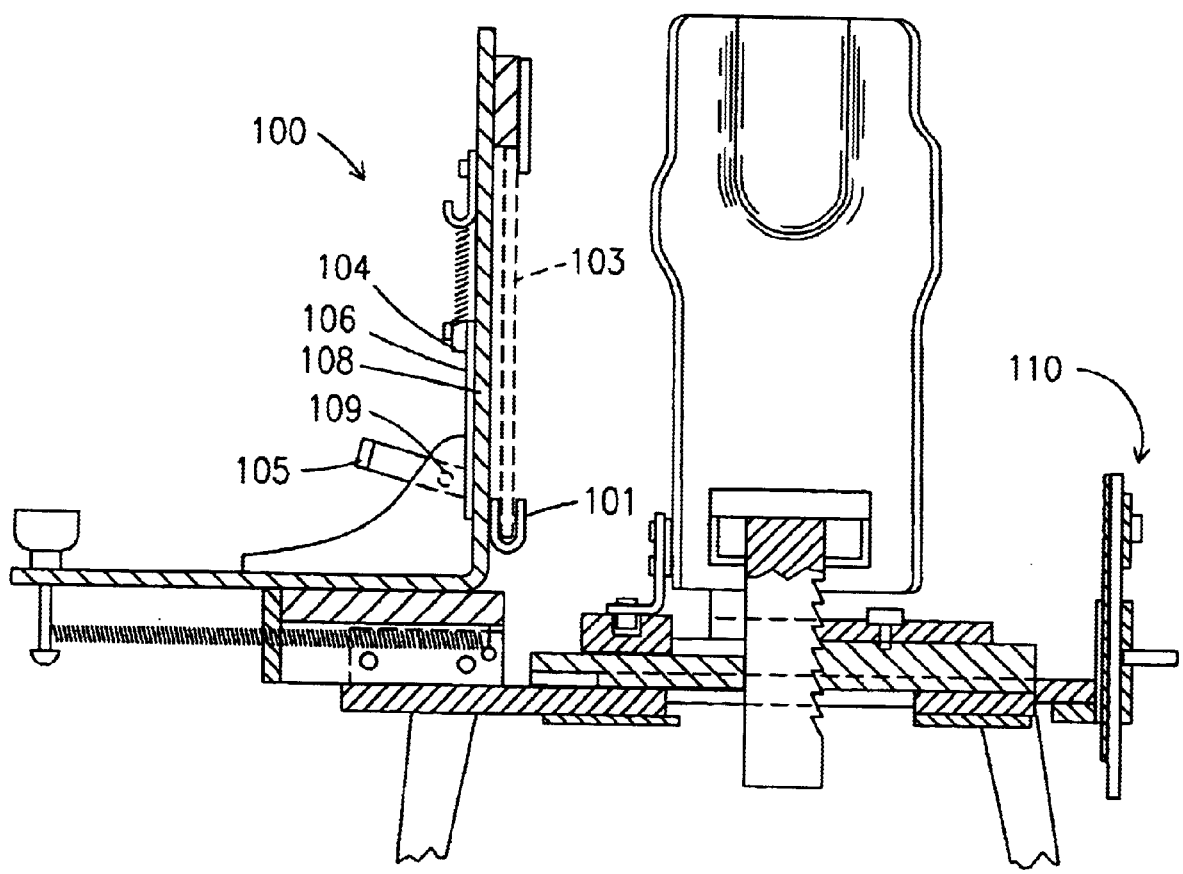
FIG. 1 is a side plan view of the positioner according to the prior art.

The present invention is designed to improve the positioning of a child during X-ray photography. Referring now to the drawings in more detail. FIG. 1 illustrates a prior art upright child positioner, which uses film positioner 100 with latch 105 to secure rear brackets of carriage 104 to L-angle 108 after the X-ray film cassette 103 is positioned properly for taking an X-ray.

Figure 2:
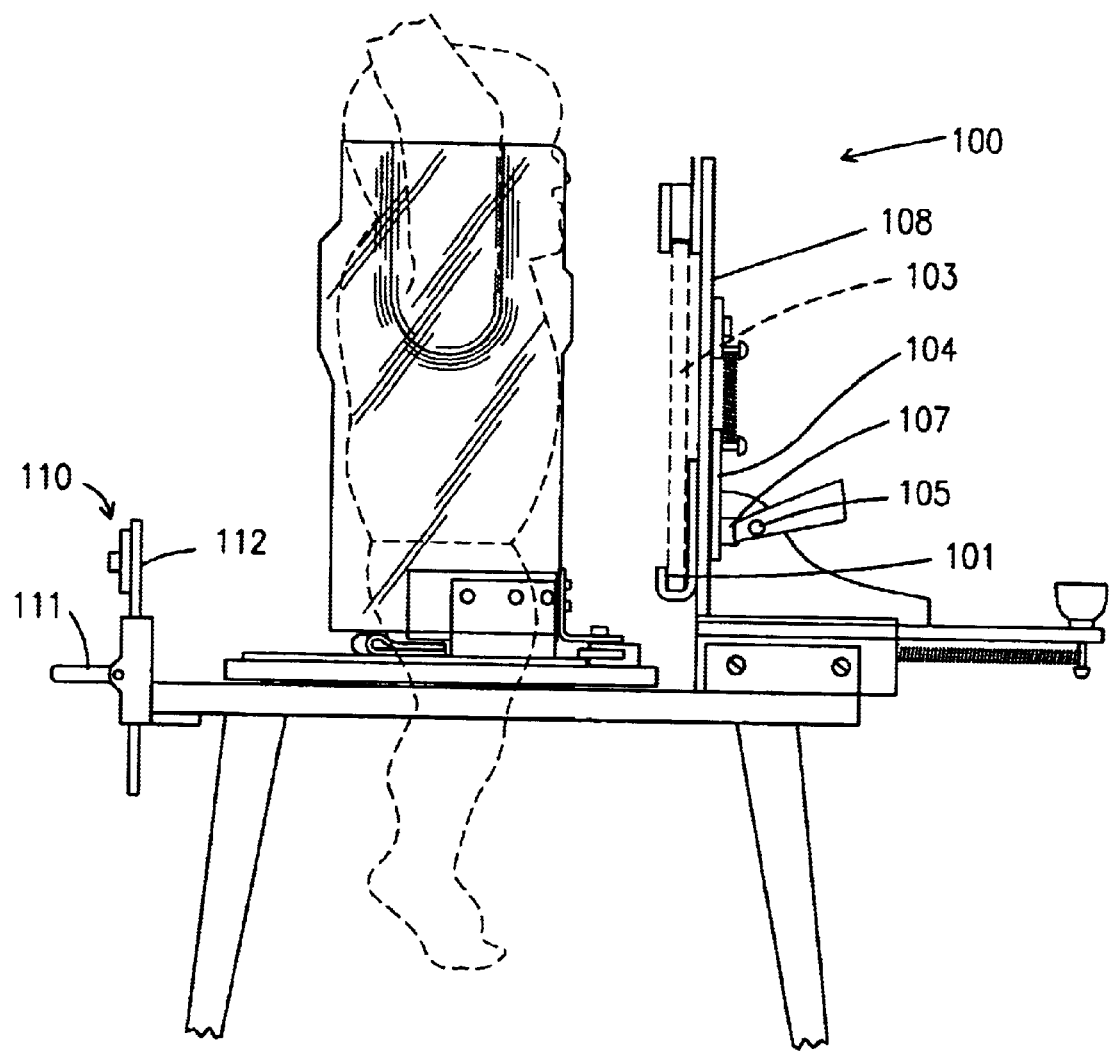
FIG. 2 is a side view of the positoner according to the prior art including the friction pads, where the dotted line shows the position that would be occupied by the body of a small child supported in the positioner.

FIG. 2 illustrates an improved prior art child positioner in that the latch 105 has friction pad 107 to facilitate securing the rear tracks of carriage 104 to the L-angle 108. A similar friction pad 107 is used on the indicia latch 111.

Figure 3:
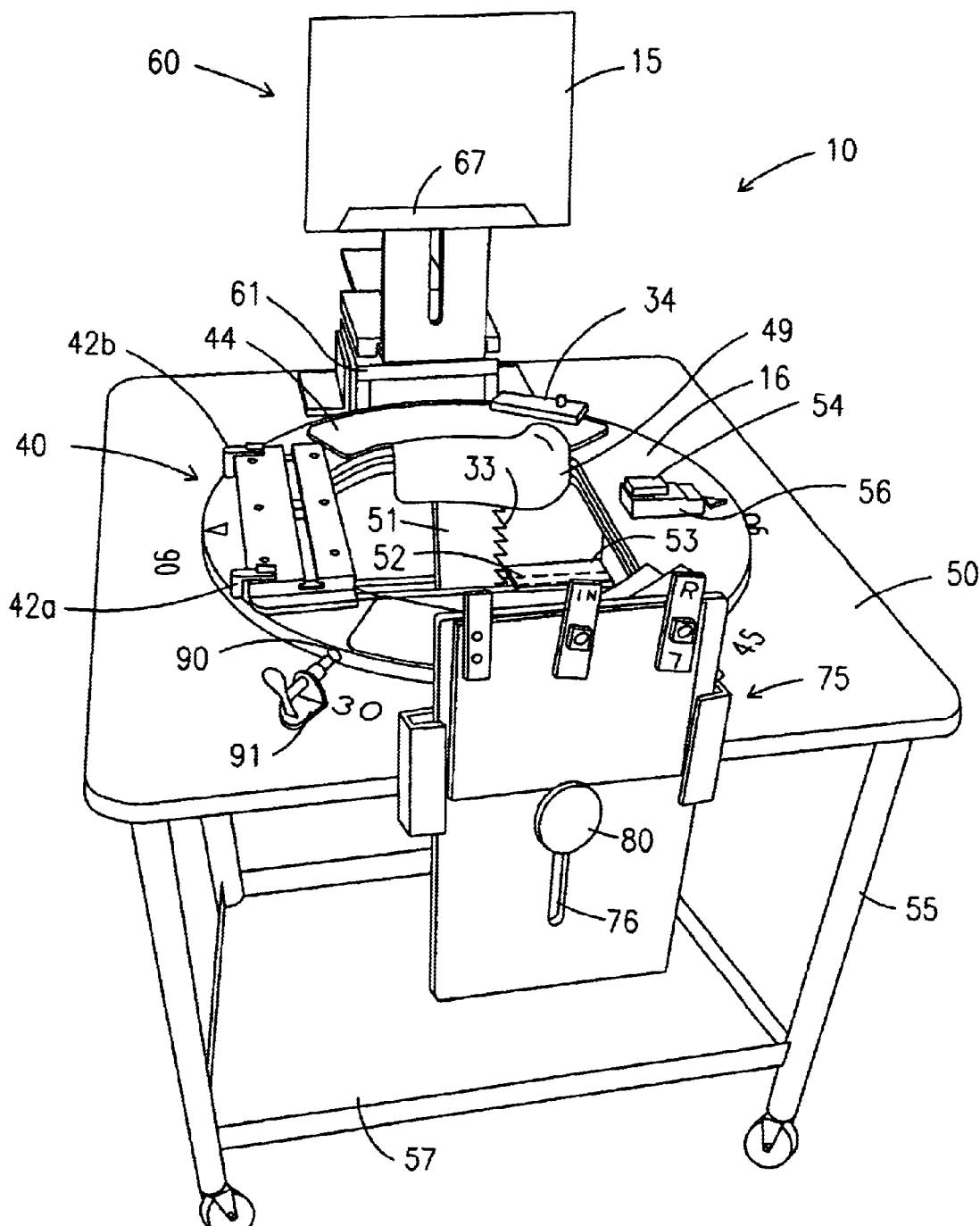
FIG. 3 is a perspective view of the present invention.

FIG. 3 illustrates the child positioner of this invention. The child positioner 10 is based on top 50 stabilized by frame 55. The frame 55 is preferably made from stainless steel to prevent corrosion, and welded at its principal joints to prevent gradual wobbliness due to loose fasteners. Frame 55 also supports accessory tray 57 which can hold extra parts or accessories for the child positioner 10. For instance, accessory tray 57 may hold an additional pair of upright restraints to accommodate larger or smaller children. Wheels 59 attached to the frame 55 facilitate movement of the child positioner. A turntable in the form of carousel 16 sets in the center of the top 50. In a preferred embodiment, the carousel 16 and top 50 are made of polyethylene so that little friction exists when turning the carousel 16. Ball bearings may be positioned between the top 50 and carousel 16 to facilitate rotation of the carousel 16 relative to the top 50. In a more preferred embodiment the carousel 16 rests on ultra-high molecular weight polyethylene (UHMW-PE) pads attached to the top 50 for even greater friction reduction. Because the carousel 16 is capable of being rotated with little resistance a preferred embodiment of the child positioner 10 contains a locking mechanism such as slide-lock 91. The slide lock 91 engages a selected lock hole 90 on the side of the carousel 16, which prevents the child movements from changing the position of the carousel 16 relative to the X-ray film cassette 15.

The carousel 16 holds right and left upright restraints 32, 30, best seen in FIG. 7, in a removable fashion. An additional preferred feature of the present invention is upright restraint pads 44, which serve to cushion the upright restraints 30, 32 on top of the carousel 16 and to provide additional friction to prevent the upright restraints 30, 32 from slipping when positioned around a patient. The upright restraints 30, 32 are pivotably secured to the carousel 16 by slide block 40. Slide block 40, shown in FIGS. 5a and 5b, uses spring loaded guides 42a, 42b to hold wedges 38a, 38b shown in FIG. 6b, in the slide block 40. Another preferred feature of the present invention is wing clamp 34 which serves to fix the upright wing braces 31a, 31b shown in FIG. 6b, to the carousel 16. Clamps 34 are rotated over wing braces 31a, 31b, thereby applying downward pressure and forcing the wing braces 31a, 31b against the restraint pads 44, which preferrably has a neoprene or other compressible synthetic surface.

The seat 49 is also supported by the carousel 16 and can be adjusted vertically to accomodate patients of varying height. The seat 49 is held in place by seat lock 52 which engages as a detent in one of a plurality of engagment contacts such as serations 33 of the seat stand 51. The seat lock 52 can be retracted to adjust the height of the seat 49 by pulling the lock trigger 54 which sets atop seat lock block 56. The locking mechanism also features lock cover 53 which guards against breaking the seat lock 52 when the seat 49 is inadvertently adjusted without first pulling the lock trigger 54 to disengage the lock from the seat 49. The seat lock cover 53 serves to prevent the application of leverage that could be applied by an engaged seat lock 52 being moved by corresponding movement of the seat stand 51.

As shown in FIG. 3, the X-ray film cassette 15, resting in tray 67, is properly positioned relative to seat 49 by film positioner 60. The film positioner 60 shown in detail in FIG. 4, is attached to the table 50 by mounting block 61. FIG. 4 illustrates the cassette positioner 60 in isolation. The cassette block 61 is attached to the table 50 by wing bracket 64b and a second matching opposite wing bracket (not shown) positioned on opposing sides of the cassette block 61. The horizontal portion of L-angle 62 is slidably positioned between cassette bracket guides 69a and 69b. A pass through friction fastener such as horizontal dial knob 65 may be loosened to permit movement of the L-angle 62 along horizontal groove 77, indirectly moving the X-ray film cassette 15 laterally with respect to the patient. Movement is facilitated by constructing the top layer of the mounting block out of UHMW-PE, or similar materials, thereby reducing friction between the mounting block 61 and L-angle 62, obviating the need for ball bearings in that position. Another pass through friction fastener such as vertical dial knob 66 is used in a similar manner to move the tray 67 vertically through tray guides 68a and 68b along the vertical portion of L-angle 62 through vertical groove 78. The tray 67 is shown near its top position. The pass through fastener systems allows the X-ray technician to adjust the position of the x-ray film cassette 15 with a single hand. This is because a pass through fastener is activated (loosened or tightened) on the side of the adjusting carriage opposite tray 67, yet passes through the vertical support to remain in communication with tray 67.

FIG. 5a is a top view of the slide block 40 as attached to the carousel 16 by fasteners such as screws 43. The slide block 40 contains a lengthwise channel 48 blocked by divider 41 creating channels 48a and 48b for receiving the upright restraint wedges 38a and 38b of the left and right restraints 30, 32 best seen in FIG. 6b. The wedge 38a is received into channel 48a by pulling spring loaded guide 42a to compress the spring 45 and remove slide 46a from the end of channel 48a. Once the wedge 38a is positioned within channel 48a the spring-loaded guide may be released closing slide 46a and securing the left upright restraint 30. The spring-loaded guide 42a can be easily opened by using the index finger, thereby removing the slide 46a from channel 48a.

FIG. 5b is a cut-away view of the spring-loaded mechanism for the slide block 40. Spring 45 is compressed when the spring-loaded guide 42 is drawn to remove slide 46 from the channel 48. When the spring 45 is compressed the channel 48 is cleared for receiving the wedge 38 of the upright restraint 30. As shown in FIG. 6b, when the spring 45 is released the slide 46 re-enters the channel 48 to block passage of the wedge 38 thereby securing one end of the upright restraint 30 into position.

Figure 6A:
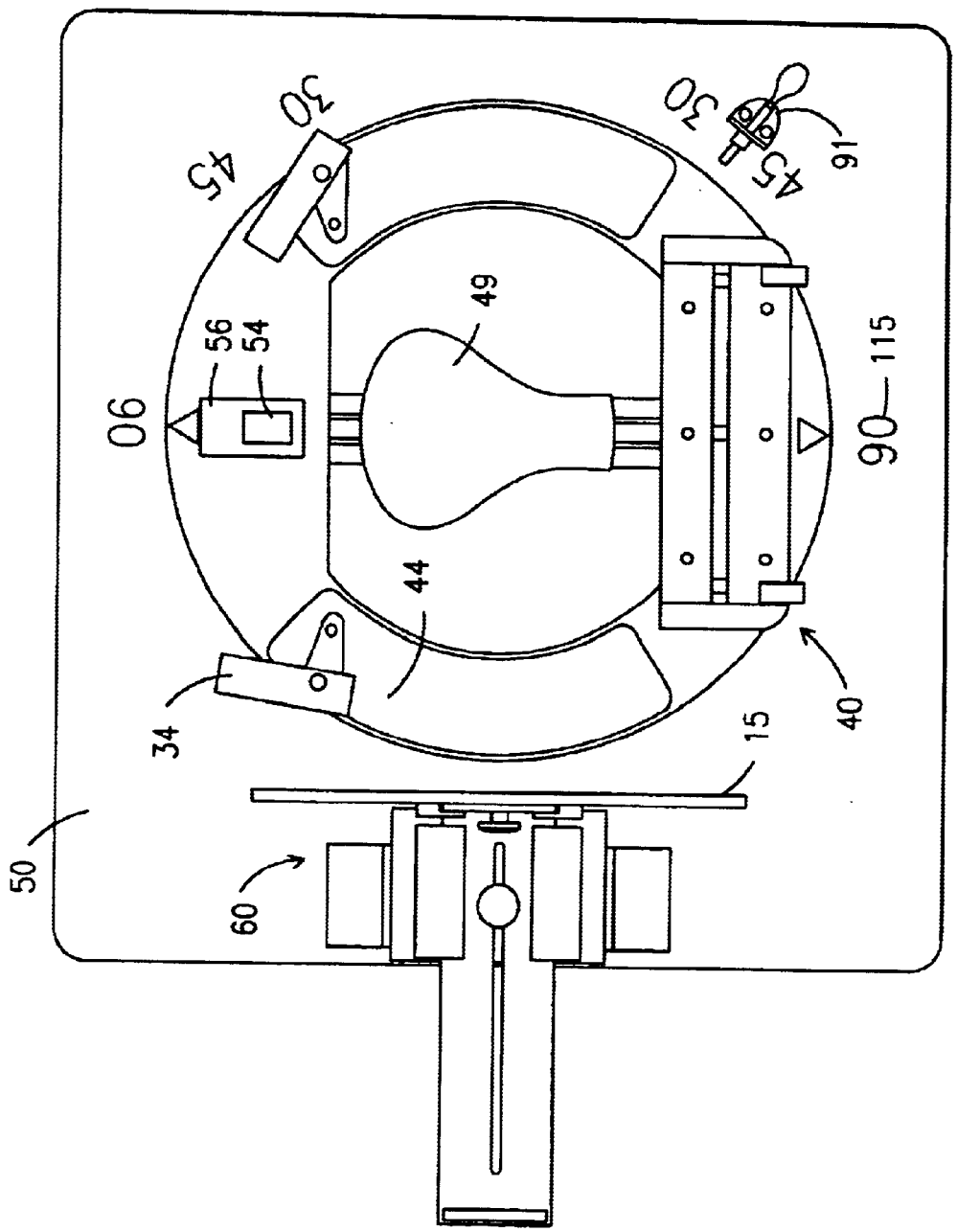
FIG. 6a is a top view of the present invention with upright restraints removed.
Figure 6B:
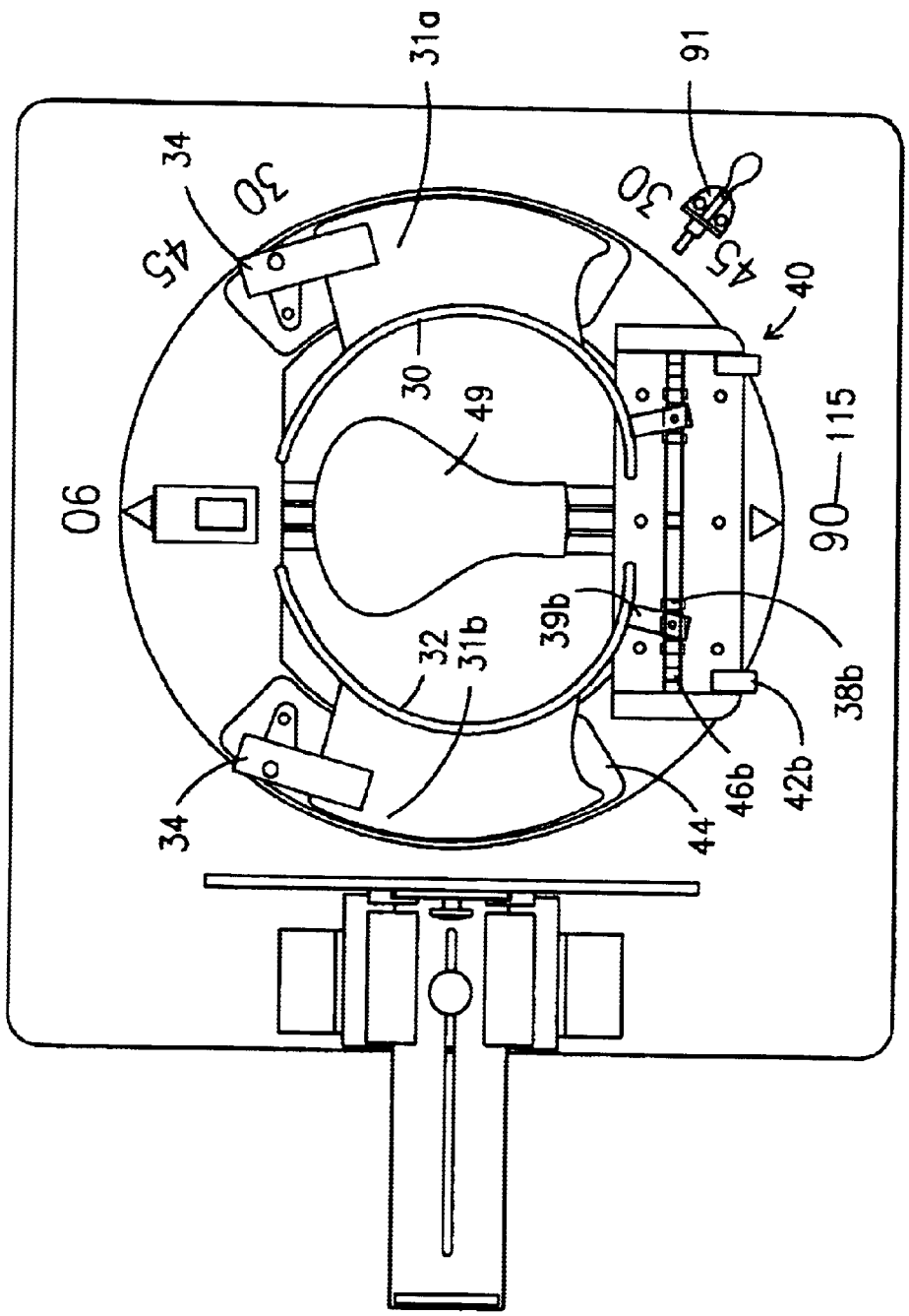
FIG. 6b is a top view of the present invention with upright restraints engaged.

FIG. 6a illustrates the child positioning apparatus 10 from the top with the upright restraints 30, 32 removed. The carousel 16 is positioned parallel to the X-ray cassette 15 at a ninety degree angle as denoted by the numerals 115. The carousel can be locked into this position by lock 91 or further turned to either the forty-five or thirty degree angle positions and locked. The carousel has a plurality of lock holes 90, shown in FIG. 3, appropriately located about the edge of the carousel for the lock 91 to engage and secure the carousel 16 at the designated angle positions. The positioner with the uprights removed shows the upright restraint pads 44 attached to the top of the carousel. The wing clamps 34 are attached to the carousel near the end of the upright restraint pads 44 opposite the slide block 40, and are shown openly positioned to receive the upright restraint wing braces 31.

FIG. 6b illustrates the child positioning apparatus 10 from the top with the upright restraints 30, 32 engaged. The wing clamps 34 are shown placed over the wing braces 31a, 31b in a closed position. The upright restraints are further restricted from movement by engagement in slide block 40. FIG. 6b shows the wedge 38b held to the upright restraint 32 by L-bracket 39b. The wedge 38b is positioned between the slide 46b and the divider 41 locking one end of upright restraint 32 into position. Upright restraint 30 is shown similarly fixed into position.

FIG. 7 illustrates the upright restraints 30 and 32 with the patient 5 in place on the child positioner 10. The first upright restraint 30 stands upright resting on L-bracket 39a. L-bracket 39a has wedge 38a attached and secured in slide block 40. Wing brace 31a is secured by wing clamp 34. The upright restraint 30 also has fasteners, such as snap 36, attached. The fastening mechanism may comprise hook and loop fasteners, but alternatives such as buckles and snaps may be used. The second upright 32 has wing brace 31b and L-bracket 39b. L-bracket 39b has wedge 38b attached and secured in slide block 40. Upright restraint 32 also has fasteners, such as, buckle 35 attached to the upright restraint 32. The strap 37 can be attached by connecting it at snap 35 on left upright 30 and passing to the buckle on the right upright 32, or the strap 37 may be wrapped completely around both upright restraints three-hundred and sixty (360) degrees and fastened a buckle on upright restraint 30 to further secure the infant within the upright restraints when in use. In alternative hook and loop fastener constructions, a strap of loop material may be fastened on upright restraint 30, and hook material may be fastened on upright restraint 32. The strap of loop material may merely be fastened over upright restraint 30 to the hook material on upright restraint 32, or may continue around and be further fastened to hook material on the reverse side of the strap.

Figure 8:
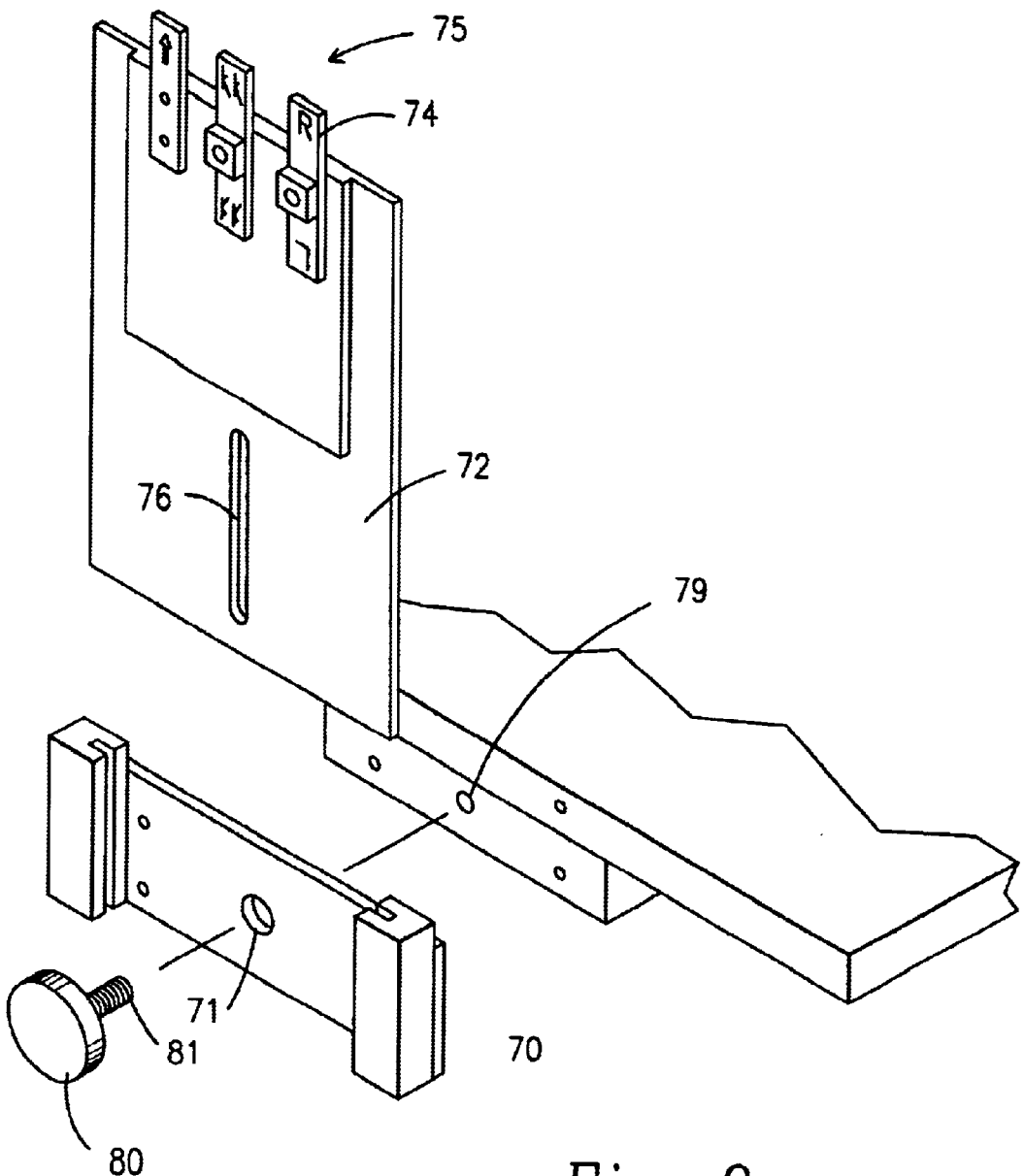
FIG. 8 is an exploded perspective view of the positioner for the indicia plate and shield.

FIG. 8 illustrates shield and indicator device 75 in isolation. The shield and indicator device 75 is mounted on the top 50 and the opposite side of child 5 from the film positioner 60. Indicia plate guide 70 secures a shield such as lead plate 73 by another pass through friction fastener, such as dial knob 80 with threaded shaft 81 passing through groove 76 on mounting plate 72. The threaded shaft 81 passes through opening 71 on guide 70, and into or through threaded opening 79 shown in a block attached to the side of top 50. Twisting the dial knob 80 thus increases or decreases friction between the knob 80 and the mounting plate 72 against guide 70. Lead indicia markers 74 and cast resin pieces are rotated to expose a position reading over lead plate 73 thereby providing relevant position information on an X-ray photograph. The mounting plate 72 may be adjusted to position the lead shield 73 to protect the reproductive organs of the child 5 being X-rayed or imaged.

FIG. 9a shows the lock 91 on top 50 disengaged from the carousel 16. Lock hole 90 is shown outlined on the carousel 16 with the lock shaft 92 positioned for entry upon lifting of lock tab 93. FIG. 9b shows the lock 91 engaged into the carousel 16 with the lock shaft 92 penetrating the lock hole 90 and the lock tab 93 lifted to a closed position.

Although a preferred embodiment of the present invention has been disclosed herein, it will be understood that various substitutions and modifications may be made to the disclosed embodiment described herein without departing from the scope and spirit of the present invention as recited in the appended claims.

What is claimed is:

1. A child positioning apparatus having a rotatable turntable comprising:
   (a) A vertical film cassette positioner comprising:
      (i) an L-angle having a vertical portion and a horizontal portion said horizontal portion mounted in a block attached to a top of the child positioning apparatus;
      (ii) a vertical groove in the vertical portion of the L-angle;
      (iii) a film cassette tray;
      (iv) a right and left tray guide attached to the tray for slidably guiding the tray along the vertical portion of the L-angle;
      (v) a dial knob having a first end attached to the tray and a connecting portion passing through the vertical groove to a control portion for engaging and disengaging the cassette tray with the vertical portion;
   (b) a second dial knob with a control portion, a connecting portion passing through the horizontal portion of the L-angle said horizontal portion having a groove and a first end attached to the block;
   (c) an upright restraint fastening mechanism supported by the turntable comprising;
      (i) a first upright restraint having a first wing brace for standing the first upright on a top of the turntable;
      (ii) a strap attached to the first upright said strap having a first side comprising a first fastenable material and a second side;
      (iii) a second upright restraint having a second wing brace for standing the second upright on the turntable top said second upright restraint having a second fastenable material attached thereon wherein the first and second fastenable materials may be removably connected;
      (iv) a first wing clamp rotatably attached to the turntable proximal to the first wing brace for engaging said first wing brace and a second wing clamp rotatably attached to the turntable proximal to the second wing brace for engaging said second wing brace;
      (v) at least one upright restraint pad between said first upright restraint and the turntable and said second upright restraint and the turntable;
   (d) an adjustable indicator plate comprising:
      (i) a guide attached to the positioning apparatus;
      (ii) a mounting plate having a front side and a rear side said mounting plate having a vertical groove on the mounting plate and being vertically moveable with respect to the guide;
      (iii) a shield attached to the mounting plate;
      (iv) a third dial knob having a control portion, a connecting portion passing through the mounting plate vertical groove and an end portion engaging the positioning apparatus, wherein the control portion is operable to engage and disengage the mounting plate and thereby allow it to be fixed in a desired position relative to the child positioning apparatus;
   (e) a turntable latch mechanism comprising:
      (i) a lock hole positioned on the perimeter of the turntable;
      (ii) a lock mechanism mounted on the top of the child positioning apparatus proximal to the perimeter of the turntable comprising:
         (1) a shaft for engaging the lock hole; and
         (2) a lock tab in communication with the lock shaft for activating the lock shaft by causing it to move forward toward the perimeter of the turntable and for deactivating the lock shaft by causing it to move rearward away from the turntable;
   (f) an adjustable seat mechanism comprising:
      (i) a seat;
      (ii) a seat stand attached to the seat having a plurality of engagement contacts;
      (iii) a seat lock for retractably engaging an engagement contact; and (iv) a seat lock cover attached to the turntable proximal to the seat lock for preventing the application of leverage to an engaged seat lock when the seat lock is moved indirectly by movement of the seat stand.

2. A child positioning apparatus having a rotatable turntable comprising:
   (a) a vertical film cassette positioner mounted on the apparatus and comprising:
      (i) an L-angle having a vertical portion and a horizontal portion said horizontal portion mounted in a block attached to a top of the child positioning apparatus;
      (ii) a vertical groove in the vertical portion of the L-angle;
      (iii) a film cassette tray;
      (iv) a right and left tray guide attached to the tray for slidably guiding the tray along the vertical portion of the L-angle;
      (v) a dial knob having a first end attached to the tray and a connecting portion passing through the vertical groove to a control portion for engaging and disengaging the cassette tray with the vertical portion; and
      (vi) a second dial knob with a control portion, a connecting portion passing through the horizontal portion of the L-angle said horizontal portion having a groove and a first end attached to the block;
   (b) an upright restraint fastening mechanism supported by the turntable;
   (c) an adjustable indicator plate mounted on the apparatus comprising a shield; and:
   (d) an adjustable seat mechanism.

3. The child positioning apparatus of claim 2 wherein the control portion of the pass through fastener is a dial knob.

4. The child positioning apparatus of claim 2 wherein the upright restraint fastening mechanism supported by the turntable has a locking mechanism comprising:
   (a) a slide block having a top, bottom, a front, a rear, and two opposing side surfaces;
   (b) a channel open to the top of the slide block and connecting the two opposing side surfaces;
   (c) a divider separating the channel creating a first sub-channel and a second sub-channel;
   (d) a first spring loaded guide having a slide for enclosing the first sub-channel between the slide and the divider; and
   (e) a second spring loaded guide having a slide for enclosing the second sub-channel between the slide and the divider.

5. The child positioning apparatus of claim 4 wherein the slide block is made of ultra high molecular weight polyethylene.

6. The child positioning apparatus of claim 2 where the adjustable indicator plate mounted on the apparatus comprises:
   (a) a guide attached to the positioning apparatus;
   (b) a mounting plate having a front side and a rear side said mounting plate having a vertical groove centered on the mounting plate and being vertically moveable with respect to the guide;
   (c) a lead shield attached to the mounting plate;
   (d) a pass through fastener having a control portion, a connecting portion passing through the mounting plate vertical groove and an end portion engaging the positioning apparatus,
wherein the control portion is operable to engage and disengage the mounting plate and thereby allow it to be fixed in a desired position relative to the child positioning apparatus.

7. The child positioning apparatus of claim 2 wherein the upright restraint fastening mechanism supported by the turntable comprises:
   (a) a first upright restraint having a first wing brace for standing the first upright on a top of the turntable;
   (b) a strap attached to the first upright said strap having a first side comprising a first fastenable material and a second side;
   (c) a second upright restraint having a second wing brace for standing the second upright on the turntable top said second upright restraint having a second fastenable material attached thereon wherein the first and second fastenable materials may be removably connected; and
   (d) a first wing clamp rotatably attached to the turntable proximal to the first wing brace for engaging said first wing brace and a second wing clamp rotatably attached to the turntable proximal to the second wing brace for engaging said second wing brace.

8. A child positioning apparatus having a rotatable turntable comprising:
   (a) a vertical film cassette positioner having an L-angle with a vertical portion and a horizontal portion, said horizontal portion mounted in a block attached to a top of the child positioning apparatus, and a film cassette tray vertically adjustable along the vertical portion of the L-angle;
   (b) an upright restraint fastening mechanism supported by the turntable comprising;
      (i) a first upright restraint having a first wing brace for standing the first upright on a top of the turntable;
      (ii) a strap attached to the first upright said strap having a first side comprising a first fastenable material and a second side;
      (iii) a second upright restraint having a second wing brace for standing the second upright on the turntable top said second upright restraint having a second fastenable material attached thereon wherein the first and second fastenable materials may be removably connected;
      (iv) a first wing clamp rotatably attached to the turntable proximal to the first wing brace for engaging said first wing brace and a second wing clamp rotatably attached to the turntable proximal to the second wing brace for engaging said second wing brace;
   (c) a turntable latch mechanism operative to prevent rotation of the turntable with respect to the child positioning apparatus; and
   (d) an adjustable seat mechanism.

9. The child positioning apparatus of claim 8 wherein the vertical film cassette positioner further comprises:
   (a) a vertical groove in the vertical portion of the L-angle;
   (b) a right and left tray guide attached to the tray for slidably guiding the tray along the vertical portion of the L-angle; and
   (c) a pass through fastener having a first end attached to the tray and a connecting portion passing through the vertical groove to a control portion for engaging and disengaging the cassette tray with the vertical portion.

10. The child positioning apparatus of claim 9 wherein the control portion of the pass through fastener is a dial knob.

11. The child positioning apparatus of claim 8 wherein the upright restraint fastening mechanism has a locking mechanism comprising:
   (a) a slide block having a top, bottom, a front, a rear, and two opposing side surfaces;

(b) a channel open to the top of the slide block and connecting the two opposing side surfaces;

(c) a divider separating the channel creating a first sub-channel and a second sub-channel;

(d) a first spring loaded guide having a slide for enclosing the first sub-channel between the slide and the divider; and (e) a second spring loaded guide having a slide for enclosing the second sub-channel between the slide and the divider.

12. The child positioning apparatus of claim 8 comprising an adjustable indicator plate mechanism for a child positioning apparatus having a lead shield.

13. A child positioning apparatus having a rotatable turntable comprising:

(a) a vertical film cassette positioner having an L-angle with a vertical portion and a horizontal portion, said horizontal portion mounted in a block attached to a top of the child positioning apparatus, and a film cassette tray vertically adjustable along the vertical portion of the L-angle;

(b) an upright restraint fastening mechanism supported by the turntable comprising;
  (i) a first upright restraint;
  (ii) a strap attached to the first upright said strap having a first side comprising a first fastenable material and a second side;
  (iii) a second upright restraint having a second fastenable material attached thereon wherein the first and second fastenable materials may be removably connected;

(c) an adjustable indicator plate mounted upon the apparatus and having a shield; and (d) an adjustable seat mechanism.

14. The child positioning apparatus of claim 13 wherein the second side of the first strap comprises the second fastenable material and when the first strap is wrapped around the first upright restraint and the second upright restraint the first fastenable material of the strap is removably connected to the second fastenable material of the strap.

15. The child positioning apparatus of claim 14 wherein the first fastenable material is loop material and said second fastenable material is hook material.

16. The child positioning apparatus of claim 13 further comprising a turntable latch mechanism for fixing the turntable relative to the child positioning apparatus.

17. The child positioning apparatus of claim 16 wherein the turntable latch mechanism comprises:

(a) a lock hole positioned on the perimeter of the turntable;

(b) a lock mechanism mounted on a top of the child positioning apparatus proximal to the perimeter of the turntable comprising:
  (i) a shaft for engaging the lock hole; and
  (ii) a lock tab in communication with the lock shaft for activating the lock shaft by causing it to move forward toward the perimeter of the turntable and for deactivating the lock shaft by causing it to move rearward away from the turntable.

18. The child positioning apparatus of claim 17 wherein the turntable latch mechanism further comprises the addition of indicia on the apparatus corresponding to degrees of rotation of the turntable from a home position.

19. The child positioning apparatus of claim 13 wherein the adjustable seat mechanism is supported by the turntable and comprises:

(a) a seat;

(b) a seat stand attached to the seat having a plurality of engagement contacts;

(c) a seat lock for retractably engaging an engagement contact; and (d) a seat lock cover attached to the turntable proximal to the seat lock for preventing the application of leverage to an engaged seat lock when the seat lock is moved indirectly by movement of the seat stand.

20. A child positioning apparatus having a rotatable turntable comprising:

(a) a vertical film cassette positioner having an L-angle with a vertical portion and a horizontal portion, said horizontal portion mounted in a block attached to a top of the child positioning apparatus, and a film cassette tray vertically adjustable along the vertical portion of the L-angle;

(b) an upright restraint fastening mechanism supported by the turntable comprising;
  (i) a first upright restraint;
  (ii) a strap attached to the first upright said strap having a first side comprising a first fastenable material and a second side;
  (iii) a second upright restraint having a second fastenable material attached thereon wherein the first and second fastenable materials may be removably connected;

(c) an adjustable indicator plate comprising:
  (i) a guide attached to the positioning apparatus;
  (ii) a mounting plate having a front side and a rear side said mounting plate having a vertical groove on the mounting plate and being vertically moveable with respect to the guide;
  (iii) a shield attached to the mounting plate;
  (iv) a dial knob having a control portion, a connecting portion passing through the mounting plate vertical groove and an end portion engaging the positioning apparatus, wherein the control portion is operable to engage and disengage the mounting plate and thereby allow it to be fixed in a desired position relative to the child positioning apparatus;

(d) an adjustable seat mechanism.

21. The child positioning apparatus of claim 20 further comprising a turntable latch mechanism.

* * * * *